(12) United States Patent
Cetin et al.

(10) Patent No.: US 8,484,077 B2
(45) Date of Patent: Jul. 9, 2013

(54) USING LINEAR AND LOG-LINEAR MODEL COMBINATIONS FOR ESTIMATING PROBABILITIES OF EVENTS

(75) Inventors: Ozgur Cetin, New York, NY (US); Eren Manavoglu, Menlo Park, CA (US); Kannan Achan, Mountain View, CA (US); Erick Cantu-Paz, Sunnyvale, CA (US); Rukmini Iyer, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 260 days.

(21) Appl. No.: 12/893,939

(22) Filed: Sep. 29, 2010

(65) Prior Publication Data

US 2012/0022952 A1 Jan. 26, 2012

Related U.S. Application Data

(63) Continuation-in-part of application No. 12/840,598, filed on Jul. 21, 2010, now Pat. No. 8,392,343.

(51) Int. Cl.
*G06Q 30/00* (2012.01)

(52) U.S. Cl.
USPC .............................................. 705/14.1

(58) Field of Classification Search
USPC ............................................. 705/14.1
See application file for complete search history.

(56) References Cited

U.S. PATENT DOCUMENTS

2007/0055477 A1* 3/2007 Chickering et al. .......... 702/182

* cited by examiner

*Primary Examiner* — Daniel Lastra
(74) *Attorney, Agent, or Firm* — Stattler-Suh PC

(57) ABSTRACT

A method for combining multiple probability of click models in an online advertising system into a combined predictive model, the method commencing by receiving a feature set slice (e.g. corresponding to demographics or taxonomies or clusters), and using the sliced data for training multiple slice-wise predictive models. The trained slice-wise predictive models are combined by overlaying a weighted distribution model over the trained slice-wise predictive models. The combined predictive model then is used in predicting the probability of a click given a query-advertisement pair in online advertising. The method can flexibly receive slice specifications, and can overlay any one or more of a variety of distribution models, such as a linear combination or a log-linear combination. Using an appropriate weighted distribution model, the combined predictive model reliably yields predictive estimates of occurrence of click events that are at least as good as the best predictive model in the slice-wise predictive model set.

20 Claims, 8 Drawing Sheets

USING LINEAR AND LOG-LINEAR MODEL COMBINATIONS FOR ESTIMATING PROBABILITIES OF EVENTS

FIELD OF THE INVENTION

The present invention is related to the field of statistical modeling for making event predictions using linear and log-linear model combinations.

BACKGROUND OF THE INVENTION

In some approaches to statistical modeling, a single model is used to predict the probability of a given event based on previous events. When such single model approaches are applied to online advertising, the single statistical model is used to predict the probability of click based on a user, a query, and an advertiser. However, such a single model may not be able to fairly characterize all predictive sources observable in the data. The click-through rates (CTRs) vary among queries depending upon, for example, the commercial nature of the query. Similarly, some statistical models are biased, if merely because of the selection of predictive sources (i.e. features) used in a particular model. In the context of online advertising, one goal of user response modeling is to predict the user response c (c=1 for click, and c=0 for no click) when the user is presented with an advertisement (e.g. in a search results page). Online advertising systems often extract a variety of features (such features denoted x) from the query, advertisement, user, and location to predict the probability of a click. One desired result of online advertising user modeling is to reliably predict the probability p of a click c, based on feature set x; that is, to calculate probability p(c|x), p being the probability of a user click response based on the constituents of x. There are a number of different approaches to construct and train a predictive model p(c|x). Modeling techniques include maximum entropy (ME) models, models involving neural networks, models involving support vector machines, models involving boosted decision trees, models involving analysis and weighting based on clustering features, models using linear interpolation, models using minimum combinations (discussed below), and models using maximum combinations (also discussed below), among other modeling techniques.

Further, there are many situations where, if a particular event is prevalent (e.g. a query-advertisement pair resulting in a click), reliable estimates of the probability of click can even be extracted from the empirical averages. There are also situations where different models use disjoint sets of features or predictors, such as relevance models that rely only on syntactic features. Still other models involve empirical click-through data (e.g. click-through rate, CTR, data, etc) organized into models using the historical empirical click-through data.

What is needed is a way to define and train a set of predictive models, capture predictions corresponding to the predictive models (i.e. the predictive models being members of the set of predictive models), and then to combine those predictive models in such a manner that the combined predictive model reliably yields predictive estimates of occurrence of events that are at least as good as the best predictive model in the set, or better.

SUMMARY OF THE INVENTION

A method for combining multiple probability of click models in an online advertising system into a combined predictive model, the method commencing by receiving a feature set slice (e.g. corresponding to demographics or taxonomies or clusters), and using the sliced data for training multiple slice-wise predictive models. The trained slice-wise predictive models are combined by overlaying a weighted distribution model over the trained slice-wise predictive models. The combined predictive model then is used in predicting (for example) probability of a click given a query-advertisement pair. The method can flexibly receive slice specifications, and can overlay any one or more of a variety of distribution models, such as a linear combination or a log-linear combination. Using an appropriate weighted distribution model, the combined predictive model reliably yields predictive estimates of occurrence of click events that are at least as good as the best predictive model in the slice-wise predictive model set.

Embodiments can be in the form of a computer-implemented method, an advertising network, as well as in the form of a computer-readable medium.

BRIEF DESCRIPTION OF THE DRAWINGS

Certain novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

This application hereby expressly incorporates by reference U.S. patent application Ser. No. 12/840,598, filed Jul. 21, 2010.

Overview of Networked Systems for Online Advertising

Figure 1:
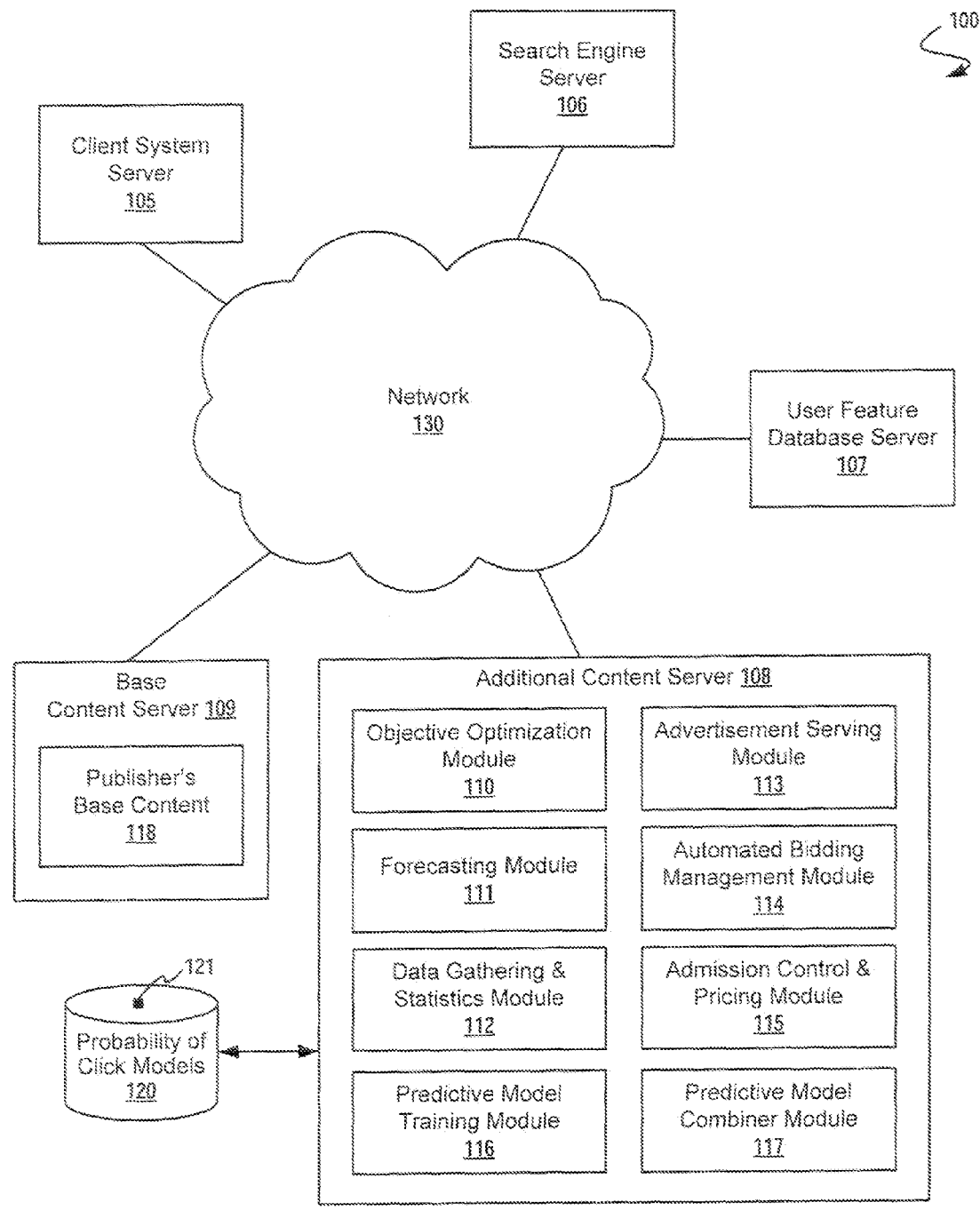
FIG. 1 depicts an advertising server network environment including modules for using linear and log-linear model combinations for estimating probabilities of events, in which some embodiments operate.

FIG. 1 depicts an advertising server network environment including modules for using linear and log-linear model combinations for estimating probabilities of events. In the context of internet advertising, placement of advertisements within an internet environment (e.g. online advertising system 100 of FIG. 1) has become common. By way of a simplified description, an internet advertiser may select a particular property (e.g. Yahoo.com/Search), and may create an advertisement such that whenever any internet user, via a client system server 105, renders the web page from the selected property, possibly using a search engine server 106, the advertisement is composited on the web page by one or more servers (e.g. a base content server 109, an additional content server 108) for delivery to a client system server 105 over a network 130. Given this generalized delivery model, and using techniques disclosed herein, sophisticated online advertising might be practiced. More particularly, an advertising campaign might include highly customized advertisements delivered to a user corresponding to highly specific target predicates, or, even in the absence of highly specific target predicates, an advertising campaign may use techniques for estimating probabilities of events (e.g. click events) in online advertising using predictions combined from multiple predictive models. Again referring to FIG. 1, an internet property (e.g. a publisher hosting the publisher's base content 118 on a base content server 109) might be able to measure the characteristics of visitors (which visitors may have any arbitrary interest, demographic, target predicates, or other attributes) possibly using an additional content server 108 in conjunction with a data gathering and statistics module 112, and possibly also using historical data as pertains to user behavior observed at search engine server 106. Thus, an internet user's demographics and interest might be 'known' in quite some detail as pertains to a wide range of user queries, interest categories, or other demographics or attributes. Also, behaviors (e.g. the likelihood of a click or other measurable event) might be known in quite some detail, not only for a particular user, but also for a group of users corresponding to a particular slice of the available data. Such characteristics (i.e. one or more characteristics) and/or features (i.e. one or more features, or a particular feature set slice) can be used in statistical modeling of users. That is, a given model can predict the likelihood p of a click c based on a feature set slice, and thus, a given model can be used to calculate probability p(c|x), that quantity being the probability of a user click response based on the constituents of x.

In some cases, user data comprising constituents of feature set slice x might be accessible over network 130 via a user feature database server 107, and any other modules or nodes on the network can access specific data by query to the user feature database server 107.

In some embodiments, the online advertising system 100 might host a variety of modules to serve management and control operations (e.g. an objective optimization module 110, a forecasting module 111, a data gathering and statistics module 112, an advertisement serving module 113, an automated bidding management module 114, an admission control and pricing module 115, etc.) pertinent to serving advertisements to users. In particular, the modules, network links, algorithms, assignment techniques, serving policies, and data structures embodied within the online advertising system 100 might be specialized so as to perform a particular function or group of functions reliably while observing capacity and performance requirements. For example, a predictive model training module 116, a predictive model combiner module 117 can operate partly in an offline (or batch) mode, and partly in an online (or interactive) mode. Further, a database for storing the probability of click models 120 (which can also store one or more combined predictive models 121) can operate in an online mode or in an offline mode, or both. As shown, and without regard to allocation of any particular operation to any particular mode, the predictive model training module 116, and the predictive model combiner module 117 work in conjunction with a user feature database server 107 to implement an online advertisement system using an approach for combining estimated probabilities of events using linear and log-linear model combinations.

Overview of Approaches for Estimating Probabilities Using Linear and Log-Linear Model Combinations for Estimating As mentioned above, some approaches to online advertising user modeling might employ a single model used to predict the probability of click based on a user, a query, and an advertiser. However, such a single model, based on a single feature (or set of features) may not be able to accurately characterize all sources of variability observed in the data, nor might such a single model be able to capture contributions of all predictive variables. Indeed, the embodiments herein disclose an online advertising system that uses multiple predictive models, and quantitatively combines (using linear and log-linear model combinations) the multiple predictive models so as to enhance the performance of estimating probabilities of events (e.g. click events).

Consider a plurality of probability of click models, $p_1(c|x)$, ..., $p_k(c|x)$. A selection of one or more of such models can be shown to have relatively higher (or lower) predictive accuracy as compared with another model. The quantitative characteristics of a particular set of features x might warrant use of a linear model combination, or might warrant use of a log-linear model combination. Understanding the differences, and understanding techniques for combining using linear and log-linear combinations to arrive at a single probability of click estimate $p(c|x)$ is the topic of the following sections.

Linear Combination

A linear combination takes a weighted average of the predictive (i.e. probability of click) models. That is, given K predictive models, a predictive linear combination may be expressed as:

$$p(c|x) = \sum_{i=1}^{K} \alpha_i p_i(c|x)$$

where $\alpha_i$ are the non-negative combination weights such that $$\sum_{i=1}^{K} \alpha_i = 1$$

In other words, the weights $\alpha_i$ denote a probability distribution model over the K models. For embodiments implementing a uniform average, $\alpha_i=1/K$. Alternatively the plurality of $\alpha_i$ values (e.g. one $\alpha_i$ value per each of the K models) can be estimated by the expectation-maximization (EM) algorithm. In such embodiments, the more reliable models receive a relatively higher weight during the estimation process.

Log-Linear Combination

In log-linear combination, the models are linearly combined in the log domain. That is:

$$p(c=1|x) = \frac{1}{1 + \exp\left(\sum_{i=1}^{K} \alpha_i f_i(x)\right)}$$

where $\alpha_i$ are combination weights, and $f_i(x)$ is the log-odds ratio for the clicks computed using the i-th model. For computing $f_i(x)$ using the i-th model, $f_i(x)$ can be expressed as:

$$f_i(x) \equiv \log \frac{p_i(c=1|x)}{p_i(c=0|x)}$$

The combination weights $\alpha_i$ in the log-linear combination are unrestricted in the sense that the weights $\alpha_i$ need not necessarily sum to equal 1 or be non-negative (as per the constraint in the exemplary linear combination described above). The log-linear combination is a form of a maximum-entropy model. One embodiment uses a conjugate-gradient optimization algorithm to estimate the combination weights on a given data set. Of course other algorithms and/or curves and/or weighted probability distribution models are reasonable and possible. To avoid the situation that weights are unfairly optimistic, the data set used in algorithms and/or curves and/or probability distribution models should be different from the data set used to train the predictive models $p_i$. It is straightforward to see that for $\alpha_i=1$ and $\alpha_{i'}=0$ for $i'\neq i$, then $p(c=1|x)=p_i(c|x)$, i.e., the combined model reduces to the i-th model.

It is illustrative to compare the linear and log-linear combinations as follows:

The left-hand side in log-linear combination is defined only for c=1, thus, for c=0, $p(c=0|x)$ is given as: $p(c=0|x)=1-p(c=1|x)$.

As earlier indicated, the log-linear combination weights are unrestricted while the linear combination weights are restricted to be non-negative and sum to one.

The linear combination is analogous to a logical OR, and the log-linear combination is analogous to a logical AND. Thus, in the log-linear case, in order for the combined log-linear model to evaluate to a high probability of click estimate in log-linear combination, all combined models need to output a high probability of click estimate.

Estimating Probabilities of Click Events in Online Advertising Using Linear and Log-Linear Model Combinations One objective of the techniques disclosed herein is to improve the accuracy of the click-through rate (CTR) prediction by combining one or more predictive models that are sliced to pertain to statistically substantial portions of the traffic (e.g. queries in a sponsored search or display advertising system).

The system disclosed herein includes the following techniques:

1. Determine slicing: That is, determine what kinds of query subsets a particular weighting technique may improve. For example, some weighting techniques may not be effective for all applications.
2. Determine weighting strategy: That is, determine what the shape or probability distribution (e.g. weighted distribution model) may be used to apply over the set of predictive models. A particular weighting may be robust against overfitting, especially in cases of smaller query subsets. In some cases, a weighting combination may result in a better predictor than any single model considered in the combination.
3. Identify and possibly exclude parsimonious model combinations: That is, determine whether there may be any benefit to including the contributions of a particular predictive model. A particular combination that excludes certain (e.g. low performing) models may be robust against overfitting, especially in cases of smaller query subsets.

In some embodiments disclosed herein, the predictive model combiner module 117 uses multiple linear weighting models, where each weighting is adapted to a certain slice of the data. For the purpose of predictive modeling, the slices of the data may be obtained based on a hard partitioning of queries, such as by classification into categories of an ontology, or the slices of the data may be obtained based on unsupervised partitioning using one or more automatic clustering methods.

The automatic clustering methods may optimize the partitioning for model estimation purposes. In some embodiments, the linear and log-linear weighting system uses predetermined clustering of queries while, in some other embodiments, it uses automatic clustering methods for CTR modeling. In some cases, the results of automatic clustering methods may result in training a plurality of slice predictive models whereby the slices are generated based on clusters partitioned from training data. In yet other cases, a plurality of slices can be partitioned by categories of subject matter for query-advertisement pairs found in the training data set.

Various linear and log-linear weighting techniques emphasize slicing by query slices, since there are relatively straightforward methods for partitioning the queries into homogenous query slice subsets. However, modeling techniques for slicing are not limited only to queries; modeling techniques may also include slicing based on users, advertisers, and/or advertisements, or pairs or triples of data, and/or any other available data for that matter. Some of such techniques for defining and training a predictive model are discussed below.

Predictive Modeling Approach

The following description sets forth various embodiments for using linear and log-linear model combinations for estimating probabilities of events. In some embodiments, the partitioning may correspond to some human-recognizable semantic classes, or the partitioning may come from an automatic clustering technique, as mentioned above.

Disclosed just below are various click models, any or all of which may be employed in a system for using linear and log-linear model combinations for estimating probabilities of events.

Combination of Models

Regardless of how the predictive model is estimated, both the linear models and the log-linear models may be weighted for the final probability of click prediction. For illustrative purposes, using a simplified example, the final probability of click prediction of a first model and a second model may be combined using:

Linear interpolation: $p(C=1)=\alpha \times p_{first}(C)+(1-\alpha)p_{second}(C)$ Minimum combination: $p(C=1)=\min(p_{first}(C), p_{1second}(C))$ Maximum combination: $p(C=1)=\max(p_{first}(C), p_{1second}(C))$ In linear interpolation, $\alpha$ is a free, non-negative parameter between 0 and 1. In minimum combination, a high probability of click is output only if the predictions of the all of the contributing models are high. Thus, the minimum combination may be more conservative; this is analogous to a logical AND gate. On the other hand, the maximum combination outputs a high probability of click if any of the contributing models gives a high probability of click; this is analogous to a logical OR gate. For the purpose of click prediction, the techniques of method 600 may favor a probability distribution corresponding to a low-recall/high-precision region over a high-recall/low-precision region. Similarly, for the purpose of click prediction, the techniques of method 600 may favor a minimum combination over a maximum combination.

Using the techniques above, the linear and log-linear weighting system attempts to combine separately-sliced models $f_1, f_2, \ldots f_n$ in such a way that the resulting combined model is better than, or at least as good as, the best model $f_b$. Other techniques create a joint mixture model.

Mixture Modeling

In the mixture modeling approach of the present invention, instead of building separate models (e.g. one model per slice), a joint mixture model is built for all of the data:

$$p(c)=\Sigma_z p(z)p(c|z)$$

where p(z) denotes the probability of the z-th mixture component, and p(c|z) denotes the corresponding probability as predicted by the click model (all probabilities are conditioned queries, ads, etc). In this embodiment, each p(c|z) is a binary maximum-entropy (ME) model, while p(z) may be a multi-class ME model over the mixture components (see the maximum-entropy discussion, below). As a generative model, this model may be thought of as first picking a mixture component according to the distribution p(z), and then generating a click event using the predictive model p(c|z). It is not necessarily determined what the underlying z's are during training or testing as they are mainly a modeling tool and need to be integrated out as shown in the above formula. Testing is straightforward, while training requires some modifications, such as when adjusting the parameters of the component model p(c|z), a given example is assigned to the z-th component according to the posterior probability p(z|c). Thus, it is possible that each example contributes to multiple components during training.

Notice that if the probability distribution p(z) is 0/1 degenerate, then the mixture approach would reduce to the hard partitioning of the data. The mixture models may better fit to the data as the assignment of the examples to different classes is not strict, and all of the data is effectively used when estimating the parameters of each component. In addition, mixture modeling allows for optimization of clustering specifically for click prediction, (as contrasted with optimization of clustering for some other auxiliary task, such as modeling the marginal distribution of the ME features).

Figure 2:
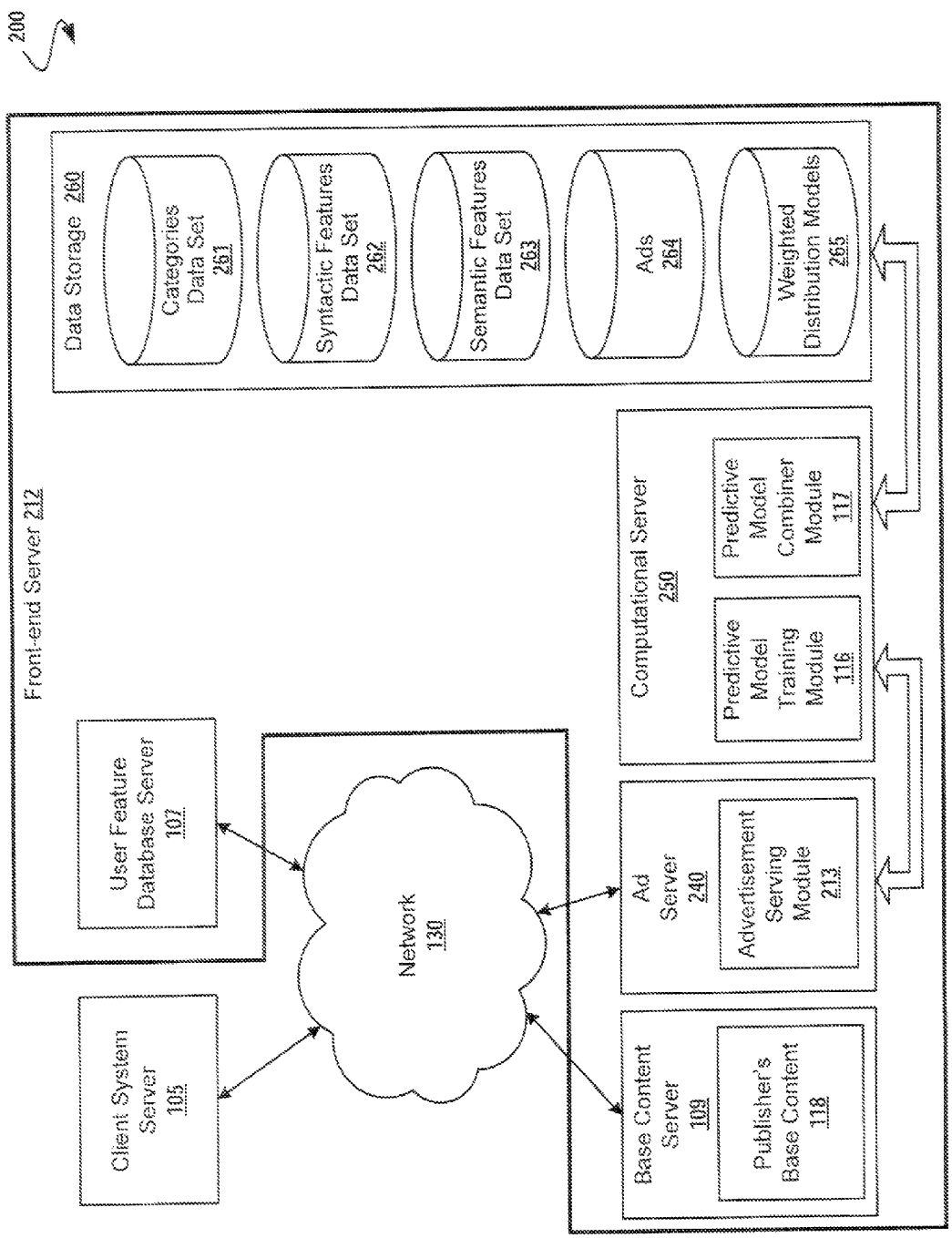
FIG. 2 depicts a block diagram illustrating a system for using linear and log-linear model combinations for estimating probabilities of events, according to one embodiment.

System for Using Linear and Log-Linear Model Combinations for Estimating Probabilities of Events FIG. 2 depicts a block diagram illustrating one embodiment of a system for using linear and log-linear model combinations for estimating probabilities of events. A module as disclosed herein may be hardware, software, or a combination thereof. Each module can be configured to carry out one or more steps in a method for using linear and log-linear model combinations for estimating probabilities of events.

The system 200 for using linear and log-linear model combinations for estimating probabilities of events may be partitioned into multiple modules, which may include a client system server 105, a base content server 109, and/or an additional content server (e.g. ad server 240), and/or a computational server 250, any or all of which may be connected to a network 130 (e.g. internet, intranet, subnet, etc), and any or all of which may be connected to data storage 260. The system 200 might be further configured to select additional content (e.g. advertisements) to be sent to a user/client system, possibly together with related base content (e.g. base content for an auto dealership might include additional content in the form of an advertisement for a featured automobile). The front-end server(s) 212 (e.g. comprising a base content server 109, an ad server 240, a computational server 250, and/or additional servers) may serve as a customized web server. The network 130 may be any combination of networks including, without limitation, the web (i.e. the internet), a local area network, a wide area network, a wireless network, a cellular network, etc.

More specifically, the client system server 105 is configured to request and receive content (e.g. in the form of web pages) from the front-end server(s) 212 where such content may include base content (e.g. a requested web page, search page results, etc) and/or additional content (advertisements, an advertising campaign control panel, a dashboard, a keyword input screen device, etc).

The computational server 250 may include a predictive model training module 116 and a predictive model combiner module 117 which, in conjunction with the data storage 260, can be used for training and combining predictive models to estimate, for example, the probability of events (e.g. a click by a user on an ad) given a model and a feature set slice. Data storage 260 contains various kinds/types of data sets such as, for example, an enumeration of categories, possibly in a categories data set 261, a syntactic features data set 262, a semantic features data set 263, and/or ads 264, and/or weighted distribution models 265.

More particularly, such a system 200, or any component therein, may be used for performing click prediction using linear and log-linear model combinations, and such click predictions may be used by an ad server, which in turn may employ any one or more specialized advertisement serving modules 213.

As for weighted distribution models 265, this data set can store distribution models in the form of arrays on numeric values representing shapes (i.e. a shape being a weighted distribution model), or can store algorithms, or can store machine-readable representations of mathematical formulas.

Model Training

Figure 3:
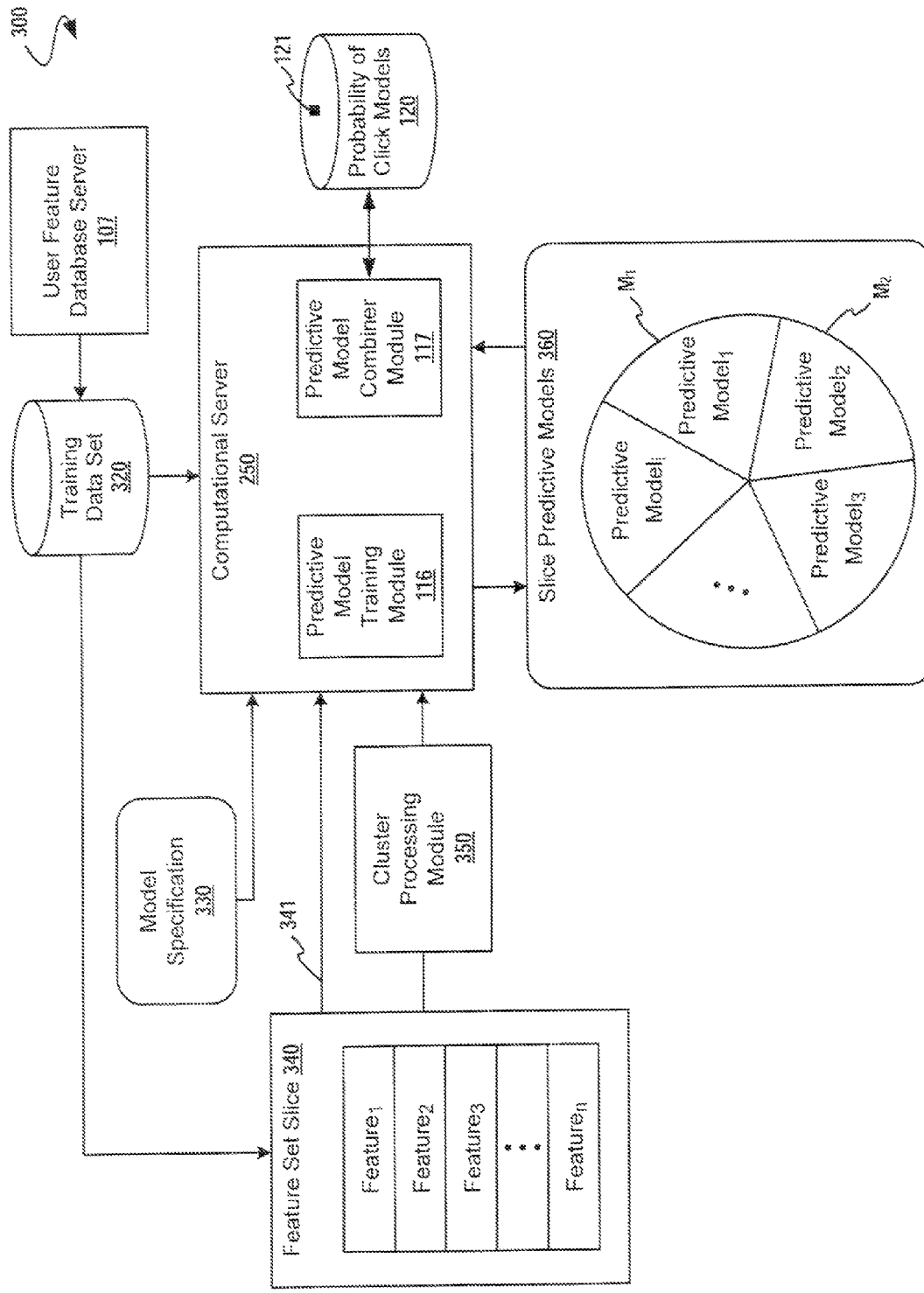
FIG. 3 depicts a block diagram illustrating a process of generating combined predictive models using linear and log-linear model combinations for estimating probabilities of events, according to one embodiment.

FIG. 3 depicts a block diagram illustrating a process of generating combined predictive models using linear and log-linear model combinations for estimating probabilities of events. As illustrated in FIG. 3, system 300 includes a predictive model combiner module 117 within a computational server 250, which computational server may access data storage 260 (see system 200). The predictive model combiner module 117 is also coupled to a cluster processing module 350, which might be implemented within a computational server 250 (see system 200), or a cluster processing module 350, might be implemented as a standalone module (as shown). As shown in FIG. 3, the modules (e.g. the predictive model combiner module 117, the cluster processing module 350, etc) may be software or hardware or a combination of software and hardware. As shown, the cluster processing module 350 can access a feature set slice 340 and a predictive model combiner module 117 (via computational server 250), and the cluster processing module 350 is further configured to partition the training data set 320 and its associated feature set slices 340.

In one embodiment, the training data set 320 may be one of the data sets stored in the data storage 260, including a categories data set 261 associated with queries and ads, alone or associated with queries. The training data set 320 comprises a plurality of features in a feature set slice 340. The feature set slice 340 consists of n numbers of features such as, for example, $Feature_1$, $Feature_2$, $Feature_3$, ..., $Feature_n$.

The predictive model combiner module 117 retrieves various data/information from the data storage 260. For instance, the predictive model combiner module 117 retrieves a training data set 320 and its associated feature set slice 340 (e.g. $Feature_1$, $Feature_2$, $Feature_3$, ..., $Feature_n$), indirectly (or possibly directly) from the data storage 260. The aforementioned association might be codified using a model and slice specification 330, which can serve to specify the task to create a predictive model, and more particularly to create such a predictive model based on a slice comprising a particular set of features. The collected data of the training data set 320 is partitioned into slices by the cluster processing module 350, and/or by virtue of the feature-wise slice specifications found within the model and slice specification 330. In such (and other) embodiments, the predictive model combiner module 117 receives a training data set 320, in particular a feature set slice 340 (retrieved from the training data set 320) with the associated feature set slice without going through a partitioning process by the cluster processing module 350 before being transmitted for processing, to train local models (see path 341). In other embodiments, the training data set with the feature set slice are first partitioned into slices by the cluster processing module 350 before being transmitted to the computational server 250 for processing (i.e. to train the predictive models). As shown, the slice predictive models 360 include i numbers of predictive models such as, for example, Predictive Model$_1$, Predictive Model$_2$, Predictive Model$_3$, . . . , Predictive Model$_i$. Each Predictive Model$_i$ is trained using training data D$_n$ and the feature set slice 340. Any one or more predictive models from the slice predictive models 360 may be stored in storage areas within a database for storing the probability of click models 120 and/or may be stored in storage areas within the data storage 260.

In one embodiment, processing for combining predictive models in an online advertising system can flow, commencing by receiving, at a computational server 250 a model and slice specification 330, comprising at least one feature set slice specification. Then using the feature set slice specification to retrieve training models from a training data set 320 for use in training (again, in a computational server 250) a plurality of slice predictive models using techniques implemented in a predictive model training module. The trained slice predictive models corresponding to at least a portion of the features in the at least one feature set slice can be stored in any storage facility, for example within a data storage 260, or for example in a database containing probability of click models 120. When at least two trained slice predictive models are available to the computational server, the predictive model combiner module can commence processing for the purpose of weighting the at least two trained slice predictive models by overlaying a weighted distribution model over the trained slice predictive models, thus calculating a combined predictive model 121 based on the weighted distribution model over the at least two trained slice predictive models.

A Process for Default Weighting in a Predictive Model

Figure 4:
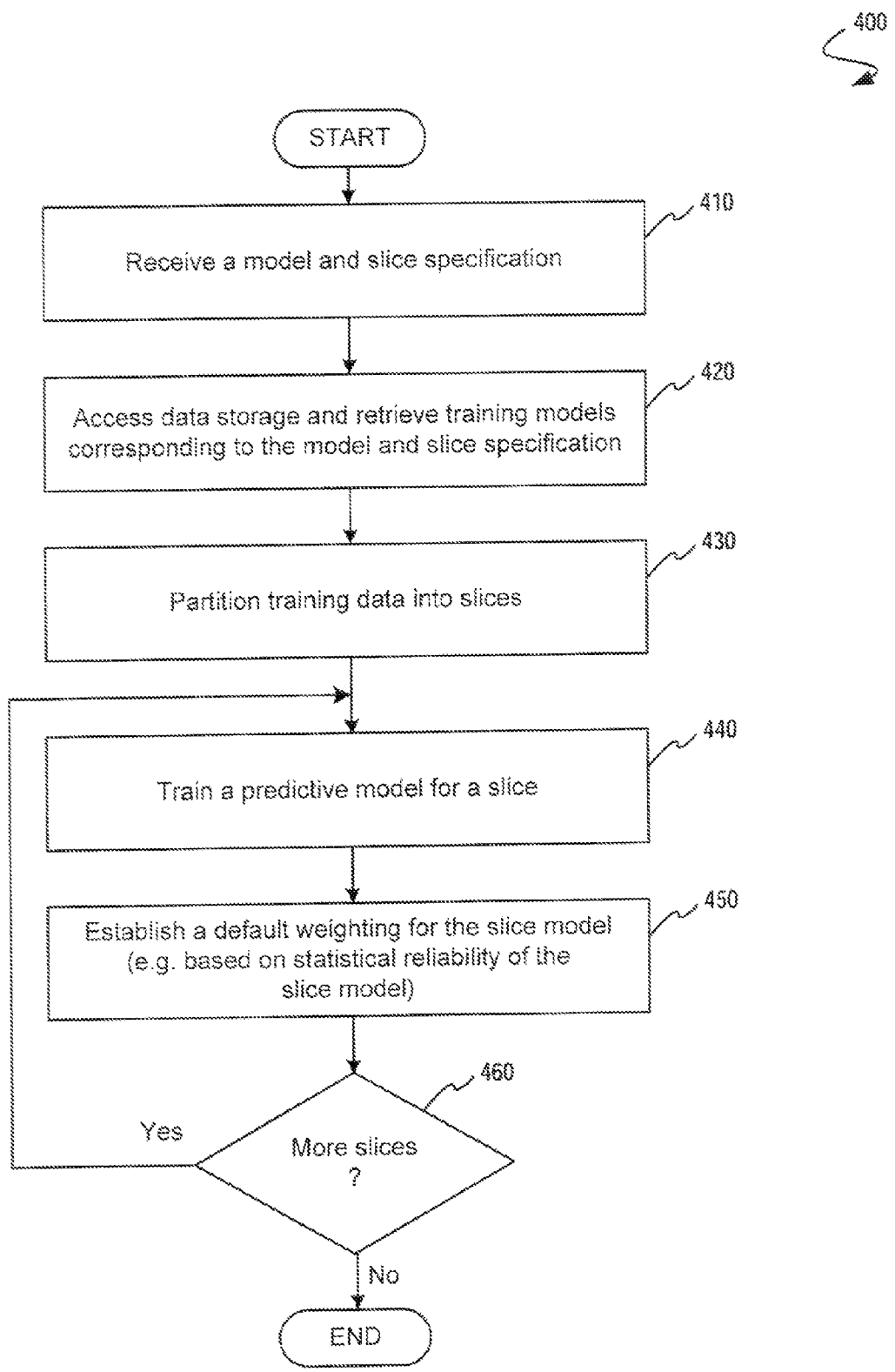
FIG. 4 depicts a flow diagram illustrating a process for selecting default weighting for a predictive model, according to one embodiment.

FIG. 4 depicts a flow diagram illustrating a process for selecting default weighting for a predictive model. As shown in FIG. 4, the system 400 starts processing in processing block 410. At processing block 410, the system receives a model and slice specification 330, which specification refers to model and slice characteristics present in training data set 320, comprising (for example) query-advertisement pairs using at least one feature selected from a feature set slice 340. The training set of data may include additional data beyond the query-advertisement pairs; for example, queries input by a user or users, advertiser entities, and/or advertisements selected for the user query under the online advertising system.

Then in processing block 420, the system accesses the data storage 260 and retrieves training models from the training data set 320, and corresponding to the model and slice specification. The training data set 320 associated with the feature set slice 340 in accordance with the model and slice specification is used to estimate probability of click for the feature set slice 340.

In processing block 430, the system partitions the training data into a plurality of slices using the cluster processing module 350, which is possibly implemented using the computational server(s) 250 along with the predictive model combiner module 117. There are many methods for partitioning of data into slices, such as hard partitioning or automatic partitioning, as discussed above. Partitioned slices comprise n number of subsets of the training data set denoted, for example, D$_1$, D$_2$, D$_3$, . . . , D$_n$. In some embodiments, partitioning is performed based on categories of subject matter for the query-advertisement pairs.

The system then proceeds to processing block 440. In processing block 440, the partitioned training data set associated with the feature set slice is transmitted to the computational server 250 for training a predictive model within slice predictive models 360. In processing block 450, the system performs statistical analyses and estimations (e.g. regression, correlation, precision, recall analysis, etc), to establish a default weighting (or possibly multiple weightings) for the trained model and, in particular, using any of the weighting techniques discussed below (e.g. uniform average, weighted average, etc). In such embodiments, the more reliable models receive a relatively higher weight during the estimation process. In some cases, the selected slice many not have sufficient volume or correlation of data in the slice to result in a statistically reliable model. In such as case a low or zero weighting, or possibly an 'invalid' weighting marker might be used so as to mark the model for that slice as unreliable. In other cases, the statistical analysis performed in processing block 450 may indicate that the data volume and correlation is highly statistically significant, and in such a case a high weighting marker might be used so as to mark the model for that slice as slice-wise reliable. Processing continues (see decision block 460) so long as there remain slices (from processing block 430) to train and establish a default weighting.

Techniques for Adaptive Modeling of Event Prediction in Online Advertising

As discussed earlier, a central problem in online advertising is to estimate the probability of click (e.g. how likely a user will click on an ad given a query). Such an estimate is used, possibly together with the bid, in ranking the candidate ads for placement. A reliable probability estimate enables the online advertising system to serve advertisements or messages that improve revenue by increasing the click-through rate. In some embodiments, the technique focuses on queries because score calibration is eliminated when using the same model and ranking a candidate set for a query. Various methods exist for partitioning the query-advertisement pairs into subsets.

Weight Modeling

As discussed above, for click prediction, each query-advertisement pair is represented by a feature vector x and a binary indicatory (e.g. 1 for a click and 0 for not-a-click). A training data set D, consisting of historical (x, y) pairs may be extracted from sponsored search logs. The adaptive modeling system may then build a model for p(y|x) using D. The logistic regression in statistics may be used to model p(y|x) as:

$$p(y=1|x) = \frac{1}{1+\exp(-w^T x)}$$

In some embodiments, the weight vector, w, is estimated using maximum entropy (ME) models. Specifically, the technique maximizes a regularized likelihood function defined over D using a Gaussian prior over w. The weight vector, w, is obtained by maximizing the following objective function with respect to w:

$$G(w|\lambda, D) = \sum_{(x_j, y_j) \in D} \log\left(\frac{1}{1+\exp(-y_j w^T x_j)}\right) - \lambda w^T w$$

The objective function, G(w|λ, D), is parameterized by the regularization coefficient, λ, whose value is chosen by experiment and the training data set D.

Hidden Variable Models

Modifications may be made to the training system (e.g. a ME trainer) allowing for arbitrary parameter priors that may be useful for other training tasks. Also, the mixture modeling framework allows identification of hidden-variable models, for example, for building position-factored ME models based on seen/not-seen normalization. Still more, the automatic clustering methods may be used for direct handling of missing features by either integrating them out, or completing them, based, for example on a mixture of Gaussian feature models.

Using Partitioning, Clustering, and Categories

When using hard partitioning for the purpose of click modeling, it may be advantageous that the partitions selected are homogenous. In some embodiments, the modeling system initially uses predetermined query-advertisement pair partitions. In particular, partitions might be formed by categories, as according to (1) the categorization of the websites into topical categories; (2) micromarket categories; and (3) the minimum reserve pricing (MRP) categories, where a cluster is formed according to the most popular account categories for the ads displayed for that query).

Some embodiments use the aforementioned micromarket categories, which are the subsets of queries with minimal advertiser spending leakage across different subsets. In such an embodiment, the system may be configured to select the top-Most revenue generating micromarket clusters.

Figure 5:
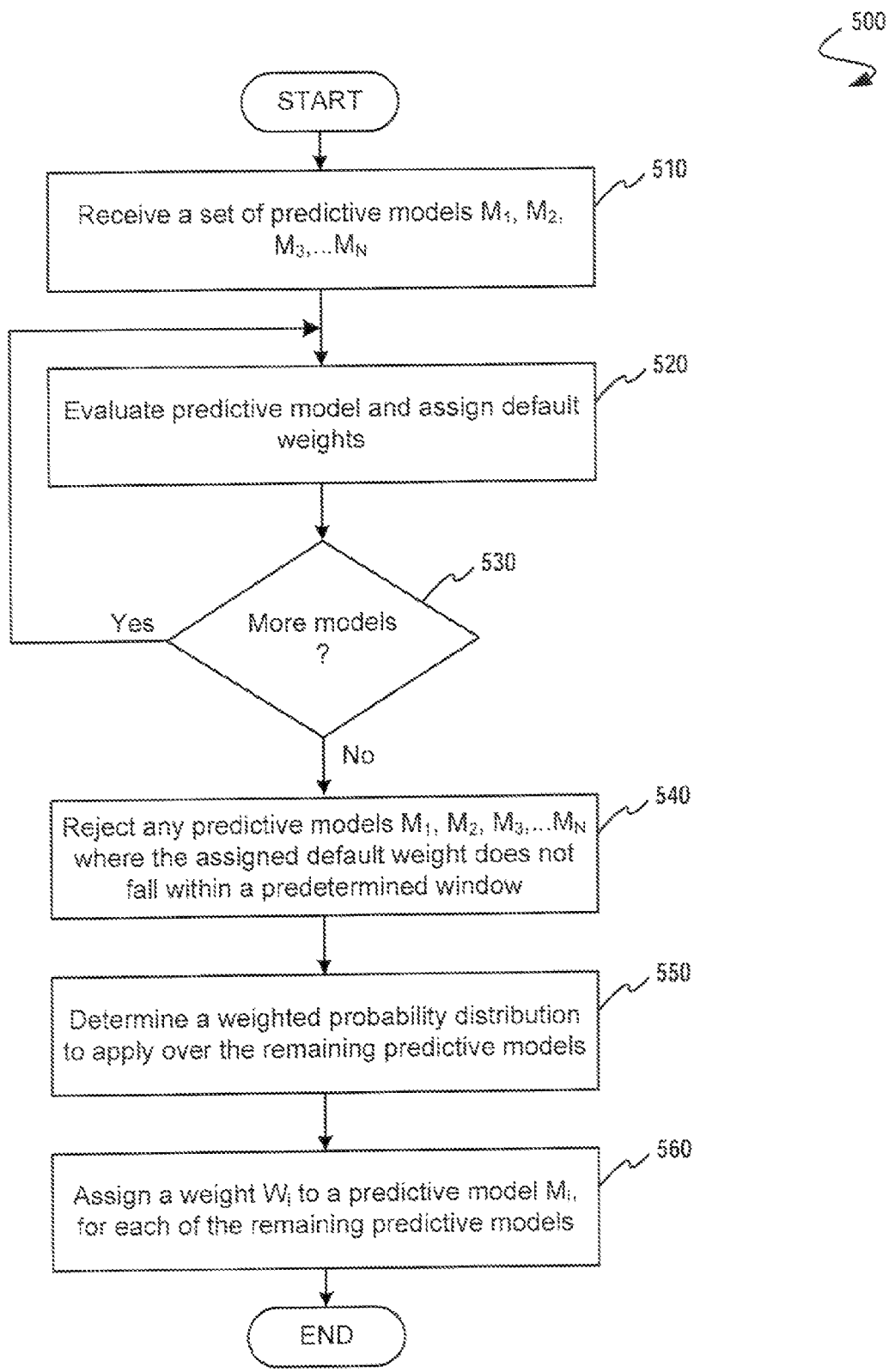
FIG. 5 depicts a flow diagram of a process for using linear and log-linear model combinations for estimating probabilities of events, according to one embodiment.

FIG. 5 depicts a flow diagram of a process for using linear and log-linear model combinations for estimating probabilities of events. As shown in FIG. 5, the system 500 receives a set of predictive models $M_1, M_2, M_3, \ldots M_N$ (see processing block 510). Then, for each predictive model received, the system 500 evaluates a predictive model and assigns a default weight (see processing block 520), possibly using the techniques of system 400. Once all models have been assigned a default weight (see decision block 530), some models might be rejected on the basis of the assigned probability weight being below a threshold (or above a threshold) or on the basis of the assigned probability weight being outside a predetermined window (see processing block 540).

The system 500 continues by determining a probability distribution to the remaining predictive models (see processing block 550). In one embodiment, the probability distribution is a uniform linear distribution of weights (e.g. the assigned weights are the same positive value, and the sum of the assigned weights equal 1). In other embodiments, the probability distribution is determined by other metrics, possibly based on the default weight, which in turn can be defined via application of one or more statistical analyses as earlier discussed. For example, a probability distribution might be selected based on the values returned by the expectation-maximization (EM) algorithm.

Thus, given a probability distribution (e.g. as determined in processing block 550), a weight $W_i$ can be assigned to a remaining model $M_i$, and such a weight assignment is performed for each of the remaining models (see processing block 560).

Figure 6:
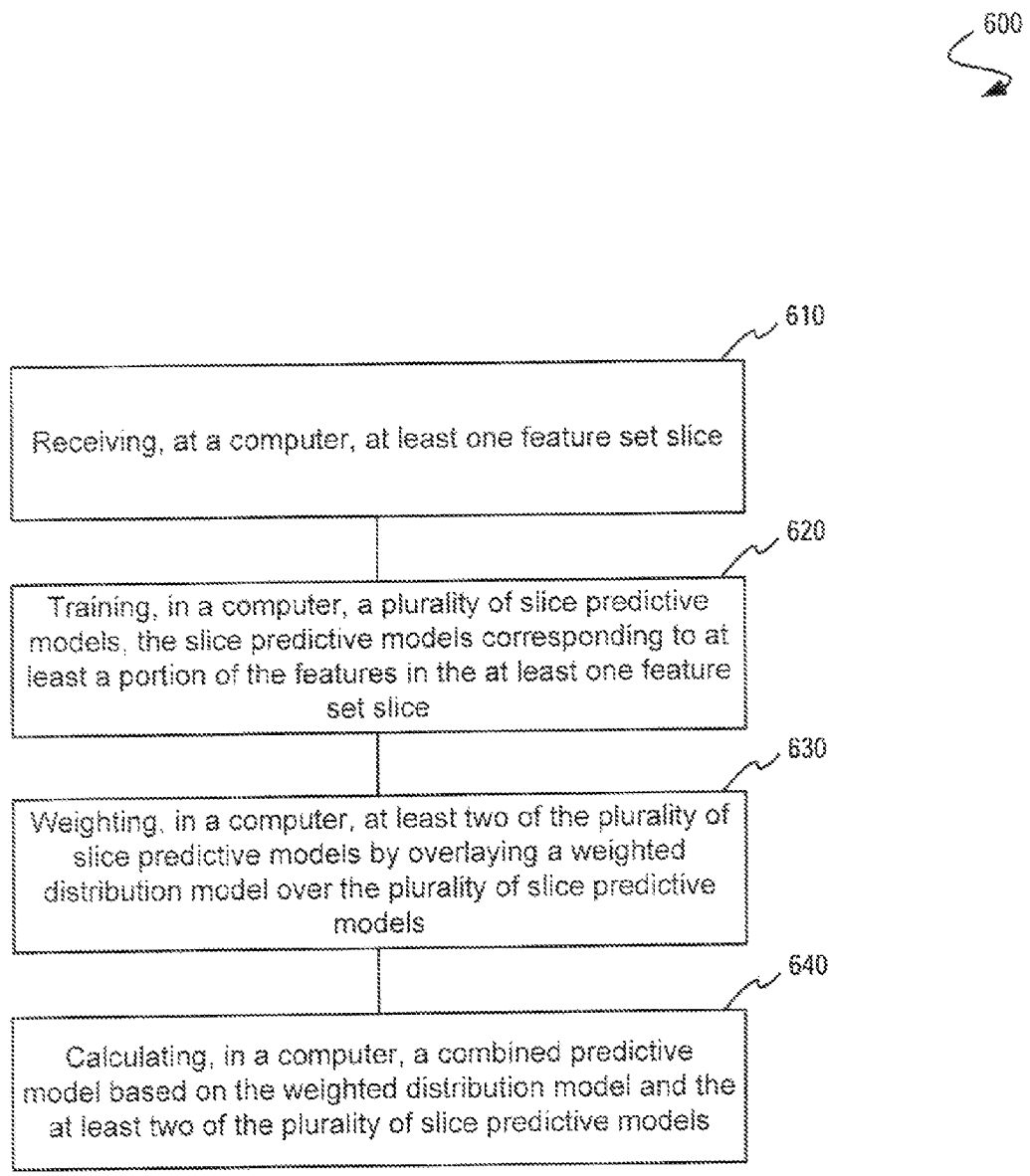
FIG. 6 depicts a block diagram of a method for combining probability of click models in an online advertising system, according to one embodiment.

FIG. 6 depicts a block diagram of a method for combining probability of click models in an online advertising system. As an option, the present method 600 may be implemented in the context of the architecture and functionality of the embodiments described herein. Of course, however, the method 600 or any operation therein may be carried out in any desired environment. Any method steps performed within method 600 may be performed in any order unless as may be specified in the claims. As shown, method 600 implements a method for combining probability of click models in an online advertising method, the method 600 comprising steps for: receiving, at a computer, at least one feature set slice (see step 610); training, in a computer, a plurality of slice predictive models, the slice predictive models corresponding to at least a portion of the features in the at least one feature set slice (see step 620); weighting, in a computer, at least two of the plurality of slice predictive models by overlaying a weighted distribution model over the plurality of slice predictive models (see step 630); and calculating a combined predictive model based on the weighted distribution model and the at least two of the plurality of slice predictive models (see step 640).

Figure 7:
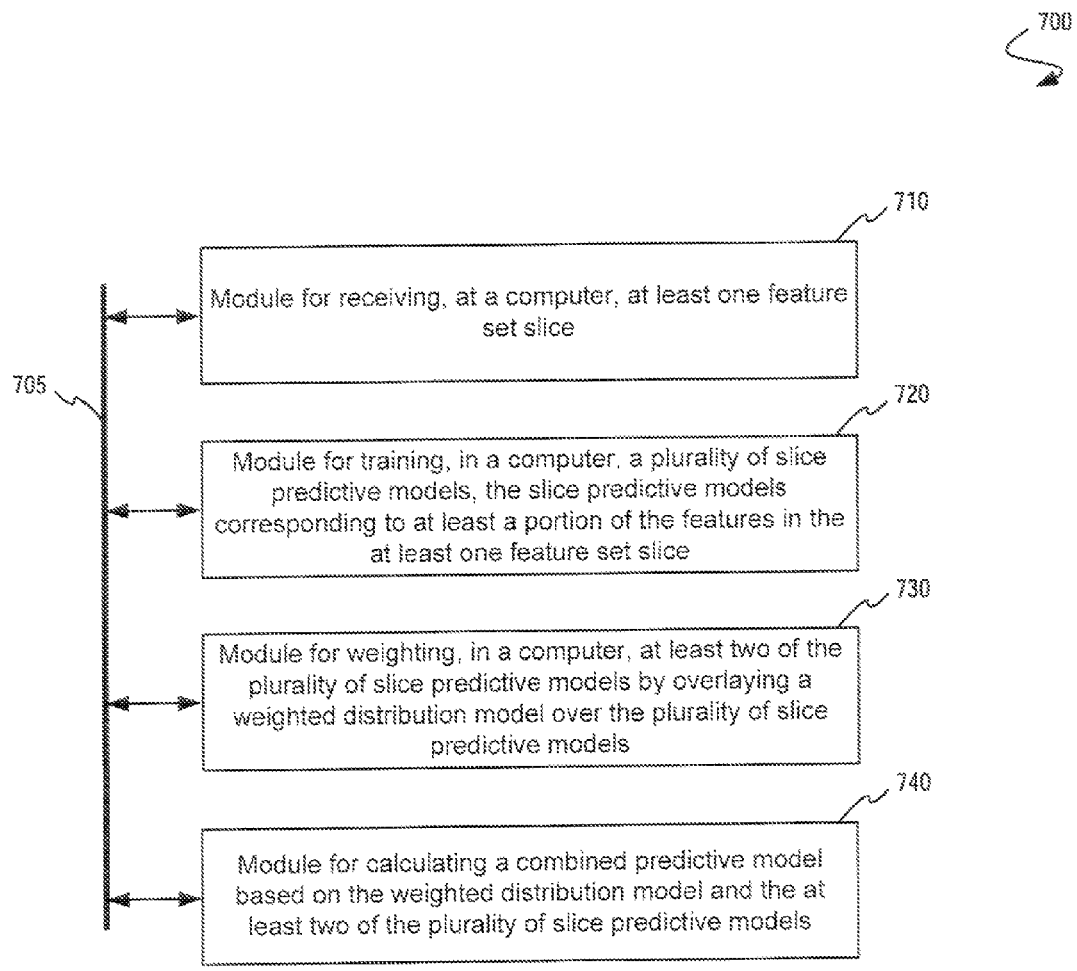
FIG. 7 depicts a block diagram of a system to perform certain functions of an advertising network, according to one embodiment.

FIG. 7 depicts a block diagram of a system to perform certain functions of an advertising network. As an option, the present system 700 may be implemented in the context of the architecture and functionality of the embodiments described herein. Of course, however, the system 700 or any operation therein may be carried out in any desired environment. As shown, system 700 comprises a plurality of modules including a processor and a memory, each module connected to a communication link 705, and any module can communicate with other modules over communication link 705. The modules of the system can, individually or in combination, perform method steps within system 700. Any method steps performed within system 700 may be performed in any order unless as may be specified in the claims. As shown, FIG. 7 implements an advertising network as a system 700, comprising modules, with at least one module having a processor and memory, and including a module for receiving at least one feature set slice (see module 710); a module for training a plurality of slice predictive models, the slice predictive models corresponding to at least a portion of the features in the at least one feature set slice (see module 720); a module for weighting at least two of the plurality of slice predictive models by overlaying a weighted distribution model over the plurality of slice predictive models (see module 730); and a module for calculating a combined predictive model based on the weighted distribution model and the at least two of the plurality of slice predictive models (see module 740).

Figure 8:
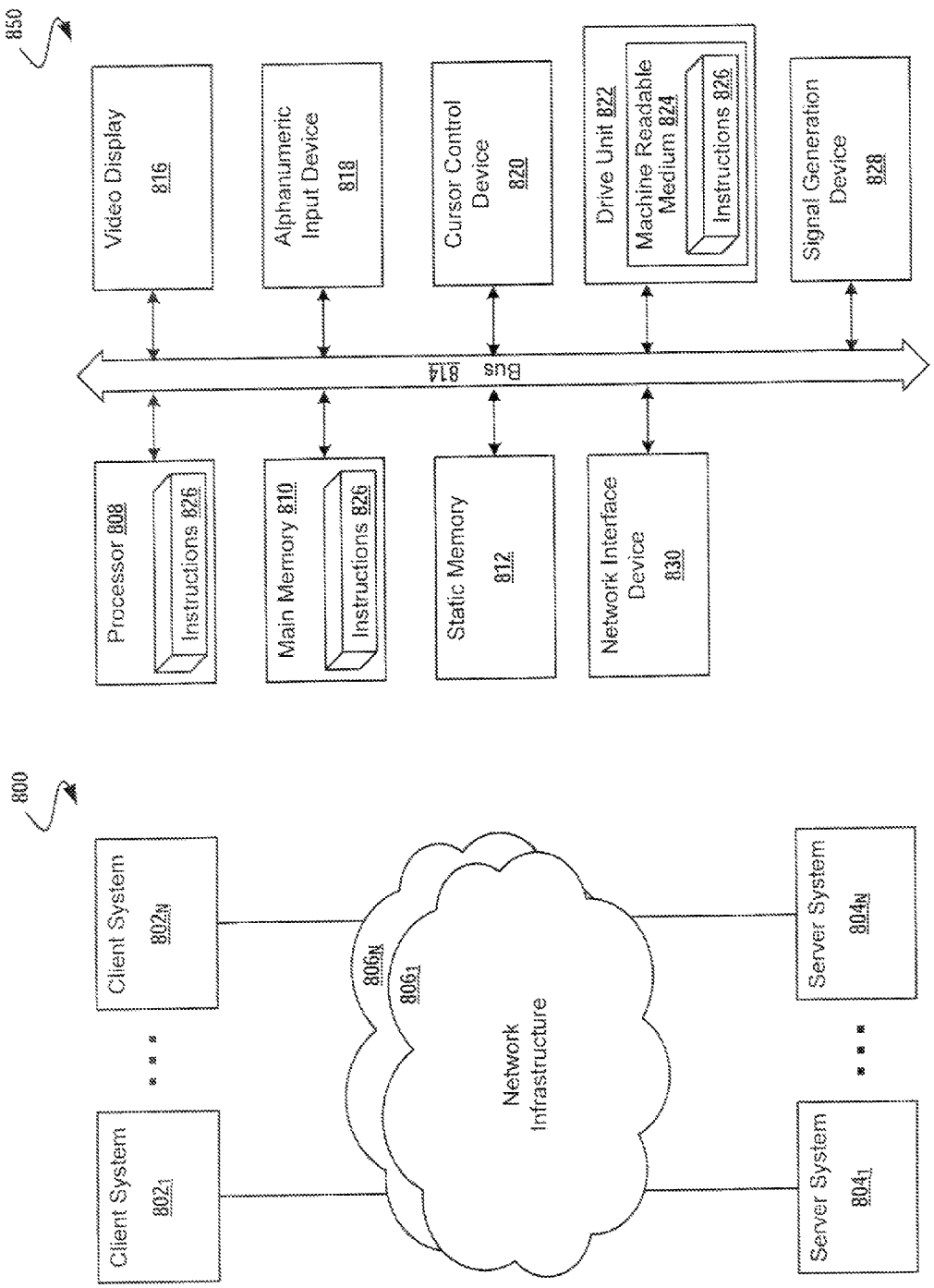
FIG. 8 is a diagrammatic representation of a network including nodes for client computer systems, nodes for server computer systems, and nodes for network infrastructure, according to one embodiment.

FIG. 8 is a diagrammatic representation of a network 800, including nodes for client computer systems $802_1$ through $802_N$, nodes for server computer systems $804_1$ through $804_N$, nodes for network infrastructure $806_1$ through $806_N$, any of which nodes may comprise a machine 850 within which a set of instructions for causing the machine to perform any one of the techniques discussed above may be executed. The embodiment shown is purely exemplary, and might be implemented in the context of one or more of the figures herein.

Any node of the network 800 may comprise a general-purpose processor, a digital signal processor (DSP), an application specific integrated circuit (ASIC), a field programmable gate array (FPGA) or other programmable logic device, discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system 850 includes a processor 808 (e.g. a processor core, a microprocessor, a computing device, etc), a main memory 810 and a static memory 812, which communicate with each other via a bus 814. The machine 850 may further include a computer display unit 816 that may comprise a touch-screen, or a liquid crystal display (LCD), or a light emitting diode (LED) display, or a cathode ray tube (CRT). As shown, the computer system 850 also includes a human input/output (I/O) device 818 (e.g. a keyboard, an alphanumeric keypad, etc), a pointing device 820 (e.g. a mouse, a touch screen, etc), a drive unit 822 (e.g. a disk drive unit, a CD/DVD drive, a tangible computer readable removable media drive, an SSD storage device, etc), a signal generation device 828 (e.g. a speaker, an audio output, etc), and a network interface device 830 (e.g. an Ethernet interface, a wired network interface, a wireless network interface, a propagated signal interface, etc).

The drive unit 822 includes a machine-readable medium 824 on which is stored a set of instructions (i.e. software, firmware, middleware, etc) 826 embodying any one, or all, of the methodologies described above. The set of instructions 826 is also shown to reside, completely or at least partially, within the main memory 810 and/or within the processor 808. The set of instructions 826 may further be transmitted or received via the network interface device 830 over the network bus 814.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; electrical, optical or acoustical or any other type of media suitable for storing information.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for combining probability of click models in an online advertising system, said method comprising:
   receiving, at a computer, at least one feature set slice;
   training, in a computer, a plurality of slice predictive models, the slice predictive models corresponding to at least a portion of the features in the at least one feature set slice;
   assigning weights, in a computer, to at least two of the plurality of slice predictive models by overlaying a weighted distribution model over the plurality of slice predictive models; and
   calculating, in a computer, a combined predictive model based on the at least two of the plurality of slice predictive models and their assigned weights.

2. The method of claim 1, further comprising receiving a model and slice specification.

3. The method as set forth in claim 1, wherein the weighted distribution model is a linear combination using a uniform average weighting.

4. The method of claim 1, wherein the combined predictive model p(c|x) is calculated using the formula:

$$p(c\,|\,x) = \sum_{i=1}^{K} \alpha_i p_i(c\,|\,x).$$

5. The method as set forth in claim 1, wherein the weighted distribution model is a log-linear combination using a maximum-entropy weighting.

6. The method of claim 1, wherein the combined predictive model p(c|x) is calculated using the formula:

$$p(c=1\,|\,x) = \frac{1}{1 + \exp\left(\sum_{i=1}^{K} \alpha_i f_i(x)\right)}.$$

7. The method as set forth in claim 1, wherein said training comprises training a predictive model using a flat weighting.

8. The method as set forth in claim 1, wherein said training a plurality of slice predictive models comprises partitioning said training data set into a plurality of slices by generating a plurality of clusters from said training data.

9. The method as set forth in claim 1, wherein said plurality of slice predictive models is partitioned by categories of subject matter corresponding to selected query-advertisement pairs.

10. A computer readable medium comprising a set of instructions which, when executed by a computer, cause the computer to combine probability of click models in an online advertising system, said instructions for:
   receiving, at a computer, at least one feature set slice;
   training, in a computer, a plurality of slice predictive models, the slice predictive models corresponding to at least a portion of the features in the at least one feature set slice;
   assigning weights, in a computer, to at least two of the plurality of slice predictive models by overlaying a weighted distribution model over the plurality of slice predictive models; and
   calculating, in a computer, a combined predictive model based on the at least two of the plurality of slice predictive models and their assigned weights.

11. The computer readable medium of claim 10, further comprising receiving a model and slice specification.

12. The computer readable medium as set forth in claim 10, wherein the weighted distribution model is a linear combination using a uniform average weighting.

13. The computer readable medium of claim 10, wherein the combined predictive model p(c|x) is calculated using the formula:

$$p(c\mid x) = \sum_{i=1}^{K} \alpha_i p_i(c\mid x).$$

14. The computer readable medium as set forth in claim 10, wherein the weighted distribution model is a log-linear combination using a maximum-entropy weighting.

15. The computer readable medium of claim 10, wherein the combined predictive model p(c|x) is calculated using the formula:

$$p(c=1\mid x) = \frac{1}{1+\exp\left(\sum_{i=1}^{K}\alpha_i f_i(x)\right)}.$$

16. The computer readable medium as set forth in claim 10, wherein said training comprises training a predictive model using a flat weighting.

17. The computer readable medium as set forth in claim 10, wherein said training a plurality of slice predictive models comprises partitioning said training data set into a plurality of slices by generating a plurality of clusters from said training data.

18. The computer readable medium as set forth in claim 10, wherein said plurality of slice predictive models is partitioned by categories of subject matter corresponding to selected query-advertisement pairs.

19. An advertising network for combining probability of click models in an online advertising system, comprising:
- a module for receiving at least one feature set slice;
- a module for training a plurality of slice predictive models, the slice predictive models corresponding to at least a portion of the features in the at least one feature set slice;
- a module for assigning weights to at least two of the plurality of slice predictive models by overlaying a weighted distribution model over the plurality of slice predictive models; and
- a module for calculating a combined predictive model based on the at least two of the plurality of slice predictive models and their assigned weights.

20. The advertising network of claim 19, further comprising a module for receiving a model and slice specification.

* * * * *